United States Patent
Kline et al.

(10) Patent No.: US 10,641,246 B1
(45) Date of Patent: May 5, 2020

(54) WIND-POWERED DISPLAY

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/195,902

(22) Filed: Nov. 20, 2018

(51) Int. Cl.
*F03D 9/34* (2016.01)
*G09F 9/302* (2006.01)
*F03D 9/11* (2016.01)

(52) U.S. Cl.
CPC ............... *F03D 9/34* (2016.05); *F03D 9/11* (2016.05); *G09F 9/3026* (2013.01); *F05B 2220/25* (2013.01)

(58) Field of Classification Search
USPC ................... 290/7, 44, 55; 340/540, 603
See application file for complete search history.

(56) References Cited

U.S. PATENT DOCUMENTS

| | | | |
|---|---|---|---|
| 5,695,346 A * | 12/1997 | Sekiguchi | G02B 27/2214 40/436 |
| 8,154,473 B2 * | 4/2012 | Engel | G09G 3/20 345/4 |
| 8,156,672 B2 | 4/2012 | Xu | |
| 8,588,830 B2 | 11/2013 | Myer et al. | |
| 9,135,839 B2 * | 9/2015 | Remenda | G09F 11/21 |
| 9,292,150 B2 * | 3/2016 | Engel | G09G 3/36 |
| 9,357,673 B2 | 5/2016 | Chin | |
| 9,541,278 B2 | 1/2017 | Wang | |
| 9,601,045 B2 * | 3/2017 | Nagahashi | G09G 5/22 |
| 9,767,719 B2 | 9/2017 | Li et al. | |
| 9,995,278 B2 * | 6/2018 | Lund | F03D 7/047 |
| 10,006,619 B1 | 6/2018 | Niemiec et al. | |
| 10,008,147 B2 * | 6/2018 | Nagahashi | G09G 5/22 |

(Continued)

OTHER PUBLICATIONS

Bai, Xuefeng et al. "Three Sides Billboard Wind-Solar Hybrid System Design" Article available at http://www.matec-conferences.org or http://dx.doi.org/10.1051/matecconf/20153102003; MATEC Web of Conferences 31, 02003 (2015); 4 pgs.

(Continued)

*Primary Examiner* — Pedro J Cuevas
(74) *Attorney, Agent, or Firm* — Cantor Colburn LLP; Tihon Poltavets (57) ABSTRACT

A wind-powered display and method and computer program products for operating the same are provided. Aspects include obtaining a content item to be displayed on a wind-powered display panel, the wind-powered display panel including a plurality of embedded turbines that each has a plurality of light emitting diodes (LEDs). Aspects also include receiving rotational information for each of the plurality of embedded turbines and determining an illumination pattern for the plurality of LEDs based on the rotational information. Aspects further include selectively activating one or more of the plurality of LEDs based on the illumination pattern to cause the content item to be displayed on the wind-powered display.

19 Claims, 4 Drawing Sheets

(56) References Cited

U.S. PATENT DOCUMENTS

| | | | | |
|---|---|---|---|---|
| 10,132,295 | B2* | 11/2018 | Lund | F03D 7/048 |
| 2005/0001433 | A1* | 1/2005 | Seelin | G09F 9/33 |
| | | | | 290/44 |
| 2010/0133850 | A1 | 6/2010 | Winkler | |
| 2011/0167687 | A1* | 7/2011 | Winkler | F03D 3/005 |
| | | | | 40/440 |
| 2011/0173853 | A1 | 7/2011 | Leveque | |
| 2012/0017476 | A1 | 1/2012 | Lee | |
| 2014/0176517 | A1* | 6/2014 | Rangesh | G09F 27/005 |
| | | | | 345/207 |
| 2016/0333854 | A1* | 11/2016 | Lund | F03D 7/047 |
| 2016/0333855 | A1* | 11/2016 | Lund | F03D 7/048 |
| 2017/0221392 | A1 | 8/2017 | Taylor et al. | |
| 2017/0372645 | A1 | 12/2017 | Cross | |
| 2018/0192493 | A1 | 7/2018 | Kinstle, III | |

OTHER PUBLICATIONS

Eco-$mart "Solar-Wind Hybrid LED Street light", Distributed by Eco-$mart, Inc. info@eco-smart.com; Undated; 11 pgs.

Liangchen, Wang "Wind-Solar Hybrid Streetlights" Bachelor's Thesis, Savonia; dated Dec. 26, 2014; 39 pgs.

Ricci, Renato et al. "An innovative wind—solar hybrid street light: development and early testing of a prototype", https://academic.oup.com/ijlct/article-abstract/10/4/420/2363561; International Journal of Low-Carbon Technologies 2015, 10, 420-429.

Solar Adtek "Solar Powered Lighting for Billboard Advertising", dated Apr. 19, 2016; Article retrieved from http://www.solaradtek.com/solution/solar-lighting-billboards/ ; 5 pgs.

Solar Electric Power Company "Commercial Solar LED Billboard Lighting", Article retrieved from https://www.sepco-solarlighting.com/solar-billboard-lighting; downloaded Oct. 30, 2018; 11 pgs.

* cited by examiner

WIND-POWERED DISPLAY

BACKGROUND

The present invention generally relates to displays, and more specifically, to a wind-powered display.

Large display boards, often referred to as billboard are used to deliver advertisements. Recently, many billboards have begun to utilize electronic displays rather than static images. Such large electronic displays require a large amount of power to operate. In general, large electronic displays, such as billboards, are placed at relatively high so that the billboard can be viewed from a long distance.

SUMMARY

Embodiments of the present invention are directed to a computer-implemented method for operating a wind-powered display. A non-limiting example of the computer-implemented method includes obtaining a content item to be displayed on a wind-powered display panel, the wind-powered display panel including a plurality of embedded turbines that each has a plurality of light emitting diodes (LEDs). The method also includes receiving rotational information for each of the plurality of embedded turbines and determining an illumination pattern for the plurality of LEDs based on the rotational information. The method further includes selectively activating one or more of the plurality of LEDs based on the illumination pattern to cause the content item to be displayed on the wind-powered display.

Embodiments of the present invention are directed to a wind-powered display. The wind-powered display includes a processing system, a battery, and a wind-powered display panel in communication with the processing system. The wind-powered display panel includes a plurality of embedded turbines that each have a plurality of light emitting diodes (LEDs) deposed thereon and a fixed array of LEDs. The wind-powered display panel also includes a plurality of electromagnetic devices each coupled to one of the plurality of embedded turbines, the plurality of electromagnetic devices configured to generate energy based on a rotation of the plurality of embedded turbines. The wind-powered display panel further includes a plurality of sensors each coupled to one of the plurality of embedded turbines.

Embodiments of the invention are directed to a computer program product for operating a wind-powered display, the computer program product comprising a computer readable storage medium having program instructions embodied therewith. The program instructions are executable by a processor to cause the processor to perform a method. A non-limiting example of the method includes obtaining a content item to be displayed on a wind-powered display panel, the wind-powered display panel including a plurality of embedded turbines that each has a plurality of light emitting diodes (LEDs). The method also includes receiving rotational information for each of the plurality of embedded turbines and determining an illumination pattern for the plurality of LEDs based on the rotational information. The method further includes selectively activating one or more of the plurality of LEDs based on the illumination pattern to cause the content item to be displayed on the wind-powered display.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
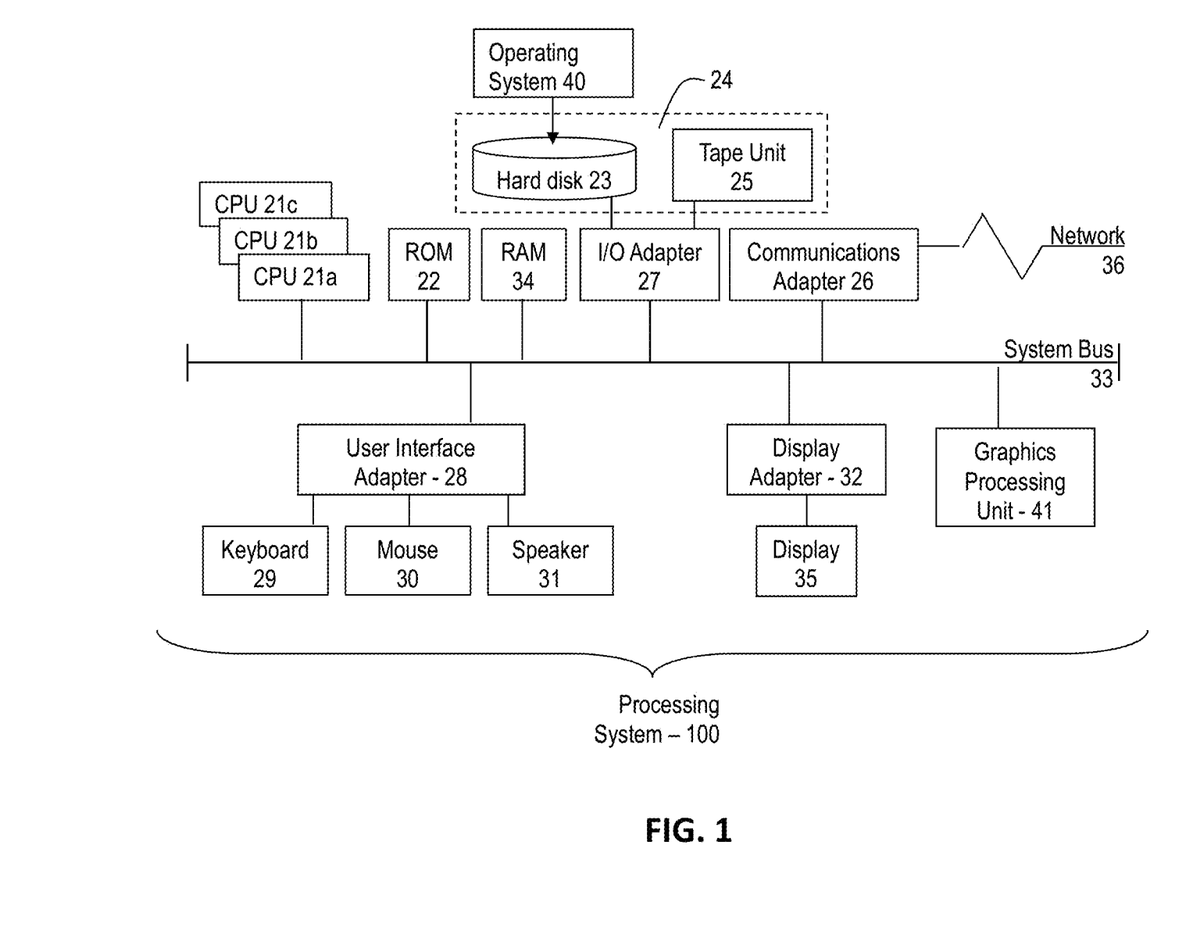
FIG. 1 depicts a block diagram of a computer system for use in implementing one or more embodiments of the present invention.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

In exemplary embodiments, a system for providing a wind-powered display is provided. In exemplary embodiments, the wind-powered display is configured to use one or more turbines, or fans, that are embedded into a display screen to harness power from wind. The wind-powered display is configured to use the captured wind power to at least partially power the video display. As a result, the wind-powered display will consume less energy and therefore will cost less to operate.

Figure 2:
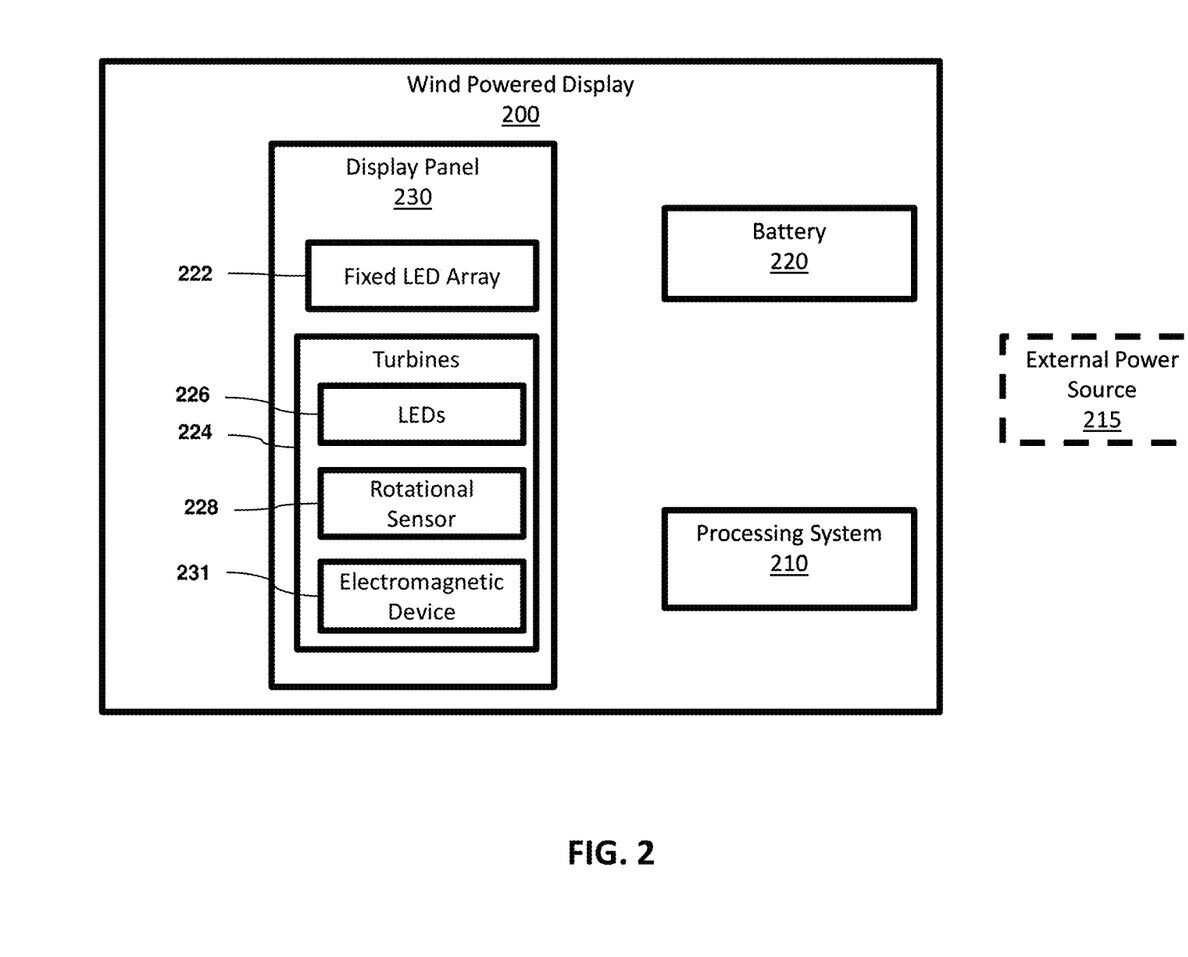
FIG. 2 depicts a block diagram of a wind-powered display according to one or more embodiments of the present invention.

Referring now to FIG. 2 a block diagram of a wind-powered display 200 according to one or more embodiments of the present invention is shown. As illustrated, the wind-powered display 200 includes a display panel 230, a battery 220, and a processing system 210. In exemplary embodiments, the processing system 210 is a processing system such as the one shown in FIG. 1. The battery 220 is configured to supply power to at least one of the display panel 230 and the processing system 210. The processing system 210 is configured to control the operation of the display panel 230. In exemplary embodiments, the wind-powered display 200 can be configured to receive power from an external power source 215, such as an electrical grid.

In exemplary embodiments, the wind-powered display 200 can be in communication with one or more additional wind-powered displays such that the content displayed on the wind-powered displays can be coordinated. In addition, the nearby wind-powered displays can also share power with each other for optimum usage of power.

In exemplary embodiments, the display panel 230 includes a fixed light emitting diode (LED) array 222 and turbines 224. The turbines 224 each include LEDs 226 that are disposed on an outward facing surface of the blades of the turbines 224. In addition, the turbines 224 each include a rotational sensor 228 that is configured to measure the rotational direction, rotational speed and the position of the turbine 224. The rotational sensors 228 are in communication with the processing system 210 and provide the measured data to the processing system 210. The turbines 224 each also include an electromagnetic device 231, such as an electromagnetic induction coil, that is configured to generate electrical current from the rotation of the turbines 224. The electromagnetic device 231 is in communication with the battery 220, which is configured to store energy produced by the electromagnetic device 231.

Figure 3A:
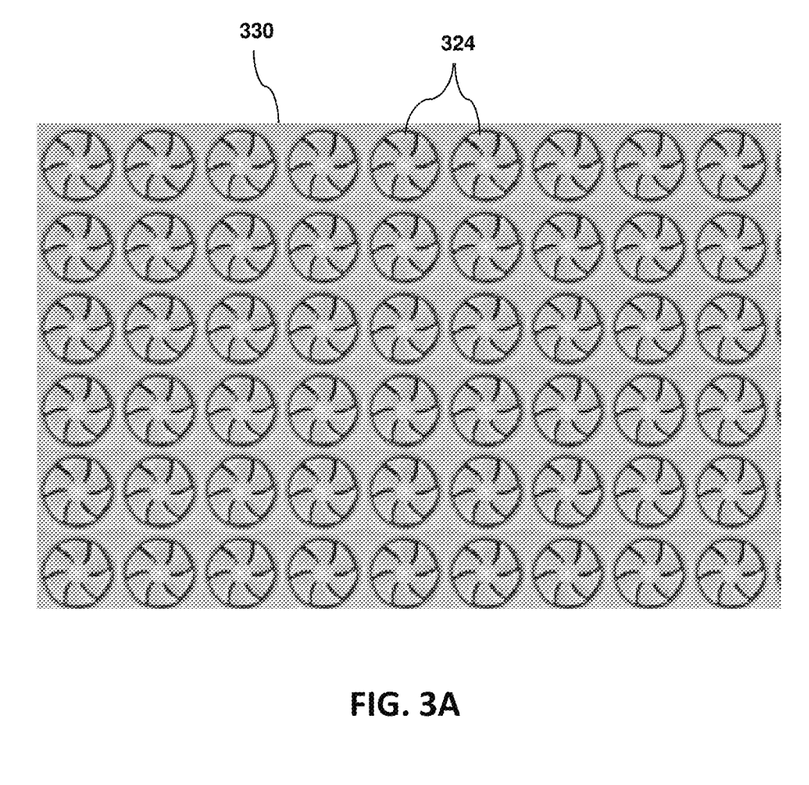
FIGS. 3A and 3B depict illustrations of a display panel of a wind-powered display according to one or more embodiments of the invention.
Figure 3B:
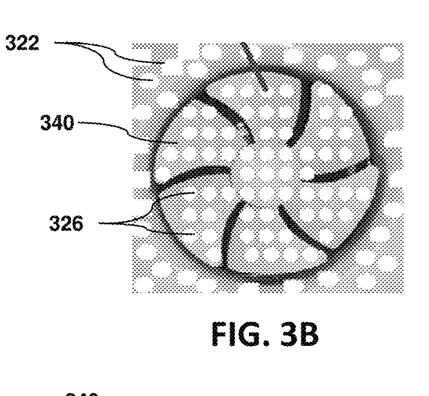

FIGS. 3A and 3B depict illustrations of a display panel 330 of a wind-powered display according to one or more embodiments of the invention. As illustrated, the display panel 330 includes a plurality of turbines 324 that are embedded in the display panel 330. In exemplary embodiments, the turbines 324 are arranged in a matrix arrangement. Each of the turbines 324 includes blades 340 that have LEDs 326 disposed thereon. The LEDs 326 are disposed on an outward facing surface of the display panel 330. In addition to the LEDs disposed on the blades 340 of the turbine 324, the display panel 330 includes LEDs 322 disposed on a fixed surface located between the turbines 324.

Figure 3C:
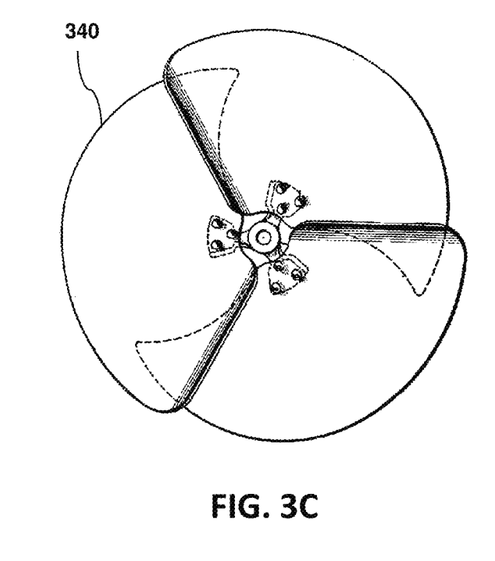
FIG. 3C depicts an illustration of a turbine configuration according to one or more embodiments of the invention.

In one embodiment, the blades 340 of the turbine are shaped such that when viewed from an axial point of view, there are no visible gaps between the surfaces of the blades, i.e., the surface of the blades at least partially overlap, such as shown in FIG. 3C. As will be appreciated by those of skill in the art, the shapes of the turbines blades 340 used can vary and the shapes of the blades 340 will impact the amount of rotation created by the wind.

During wind flow, the force of the wind on the blades 340 will cause the turbine 324 to rotate. This rotation will cause the electromagnetic device to output a current, which can be used to power the LED array 322 and the LEDs 326 of the display panel 330. In one embodiment, the current can be provided to a battery and/or the processing system that operates the display panel. In addition, during wind flow, the rotation sensor installed in each turbine will measure the rotational direction, rotational speed, and the position of the rotation turbine and will provide this data to the processing system. The processing system will utilize the received information from the turbines to determine which LEDs to activate at which time in order to display the desired content item. In exemplary embodiments, the content item can be a still image, a video or a combination of the two.

Figure 4:
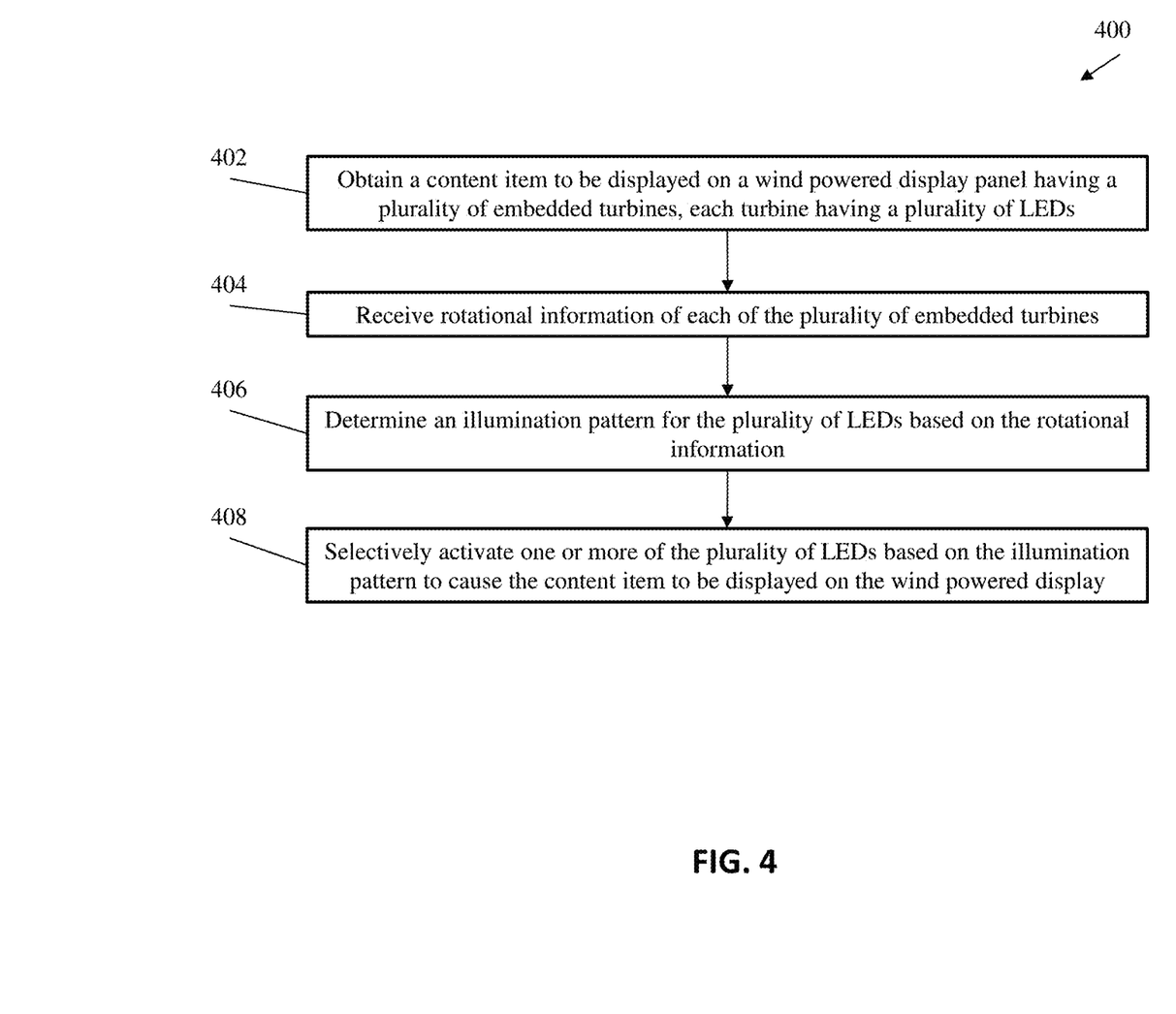
FIG. 4 depicts a flow diagram of a method for operating a wind-powered display according to one or more embodiments of the invention.

Turning now to FIG. 4, a flow diagram of a method 400 for operating a wind-powered display in accordance with an embodiment is shown. In one or more embodiments of the present invention, the method 400 may reside on a computer system or processing system, such as the processing system 100 described hereinabove and illustrated in FIG. 1, or in some other type of computing or processing environment.

The method 400 begins at block 402 and includes obtaining a content item to be displayed on a wind-powered display panel. The wind-powered display panel including a plurality of embedded turbines that each turbine has a plurality of LEDs disposed thereon. In exemplary embodiments, the content item can be a static image, a video, or a combination of the two. Next, as shown at block 404, the method 400 includes receiving rotational information of each of the plurality of embedded turbines. The rotational information includes a rotational speed, a rotational direction and a rotational position of each turbine. Next, the method 400 includes determining an illumination pattern for the plurality of LEDs based on the rotational information, as shown at block 406. The illumination pattern for the plurality of LEDs is determined such that the wind-powered display panel, including the plurality of LEDs, will display the obtained image. In exemplary embodiments, the illumination pattern is determined based on the relative position of each LED light of the display panel. Since the turbines will be rotating, the position of the blades will also be changing, but processing system can calculate the relative position of each LED light at any point of time and use this information to create the illumination pattern.

Next, as shown at block 408, the method 400 includes selectively activating the plurality of LEDs based on the illumination pattern to display the content item of the wind-powered display. In exemplary embodiments, at least part of an energy used to activate the plurality of LEDs is created based on a rotation of the plurality of embedded turbines. In exemplary embodiments, the wind-powered display panel also includes a plurality of LEDs that have a fixed position, i.e., the LEDs are not disposed on a turbine. These fixed LEDs are also selectively activated based on the illumination pattern to display the content item of the wind-powered display.

In exemplary embodiments, the wind-powered displays provided provide additional advantages other than reduced power consumption. For example, another advantage of the wind-powered display is that the wind resistance of the display panel is lower than the wind resistance of a traditional fixed display. As a result, when the wind hits the display panel the air will pass through and will be less likely to cause damage to the display.

Additional processes may also be included. It should be understood that the processes depicted in FIG. 4 represent an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a wind-powered display comprising:
    obtaining a content item to be displayed on a wind-powered display panel, the wind-powered display panel including a plurality of embedded turbines that each has a plurality of light emitting diodes (LEDs);
    receiving rotational information for each of the plurality of embedded turbines;
    determining an illumination pattern for the plurality of LEDs based on the rotational information;
    selectively activating one or more of the plurality of LEDs based on the illumination pattern to cause the content item to be displayed on the wind-powered display.

2. The computer-implemented method of claim 1, wherein at least part of an energy used to activate the plurality of LEDs is created based on a rotation of the plurality of embedded turbines.

3. The computer-implemented method of claim 1, wherein the content item is a video.

4. The computer-implemented method of claim 1, wherein the rotational information includes a rotational speed, a rotational direction and a rotational position of each of the plurality of embedded turbines.

5. The computer-implemented method of claim 1, wherein the illumination pattern for the plurality of LEDs is determined such that the wind-powered display panel, including the plurality of LEDs, displays the content item.

6. The computer-implemented method of claim 1, wherein the wind-powered display panel further comprises a plurality of fixed location LEDs.

7. A wind-powered display comprising:
a processing system;
a battery; and
a wind-powered display panel in communication with the processing system, the wind-powered display panel comprising:
  a plurality of embedded turbines that each have a plurality of light emitting diodes (LEDs) deposed thereon;
  a fixed array of LEDs;
  a plurality of electromagnetic devices each coupled to one of the plurality of embedded turbines, the plurality of electromagnetic devices configured to generate energy based on a rotation of the plurality of embedded turbines; and
  a plurality of sensors each coupled to one of the plurality of embedded turbines.

8. The wind-powered display of claim 7, wherein at least part of the energy generated by the plurality of electromagnetic devices is used to power the plurality of light emitting diodes and the fixed array of LEDs.

9. The wind-powered display of claim 7, wherein at least part of the energy generated by the plurality of electromagnetic devices is stored in the battery.

10. The wind-powered display of claim 7, wherein the processing system is configured to:
  obtain a content item to be displayed on the wind-powered display panel;
  receive rotational information for each of the plurality of embedded turbines from the plurality of sensors;
  determine an illumination pattern for the plurality of LEDs and the fixed array of LEDs based on the rotational information;
  selectively activate one or more of the plurality of LEDs d the fixed array of LEDs based on the illumination pattern to cause the content item to be displayed on the wind-powered display panel.

11. The wind-powered display of claim 10, wherein the content item is a video.

12. The wind-powered display of claim 10, wherein the rotational information includes a rotational speed, a rotational direction and a rotational position of each of the plurality of embedded turbines.

13. The wind-powered display of claim 10, wherein the illumination pattern is determined such that the wind-powered display panel displays the content item.

14. A computer program product comprising a computer readable storage medium having program instructions embodied therewith the program instructions executable by a computer processor to cause the computer processor to perform a method comprising:
  obtaining a content item to be displayed on a wind-powered display panel, the wind-powered display panel including a plurality of embedded turbines that each has a plurality of light emitting diodes (LEDs);
  receiving rotational information for each of the plurality of embedded turbines;
  determining an illumination pattern for the plurality of LEDs based on the rotational information;
  selectively activating one or more of the plurality of LEDs based on the illumination pattern to cause the content item to be displayed on the wind-powered display panel.

15. The computer program product of claim 14, wherein at least part of an energy used to activate the plurality of LEDs is created based on a rotation of the plurality of embedded turbines.

16. The computer program product of claim 14, wherein the content item is a video.

17. The computer program product of claim 14, wherein rotational information includes a rotational speed, a rotational direction and a rotational position of each of the plurality of embedded turbines.

18. The computer program product of claim 14, wherein the illumination pattern for the plurality of LEDs is determined such that the wind-powered display panel, including the plurality of LEDs, displays the content item.

19. The computer program product of claim 14, wherein the wind-powered display panel further comprises a plurality of fixed location LEDs.

* * * * *